R. CENTER.
NUT LOCK.
APPLICATION FILED NOV. 1, 1909.
951,800.
Patented Mar. 15, 1910.
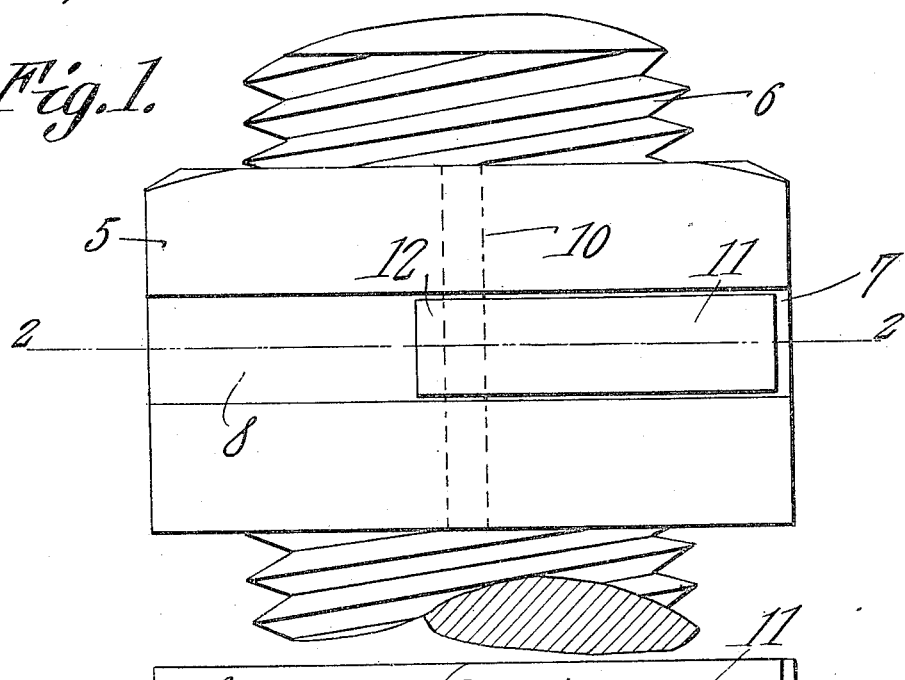
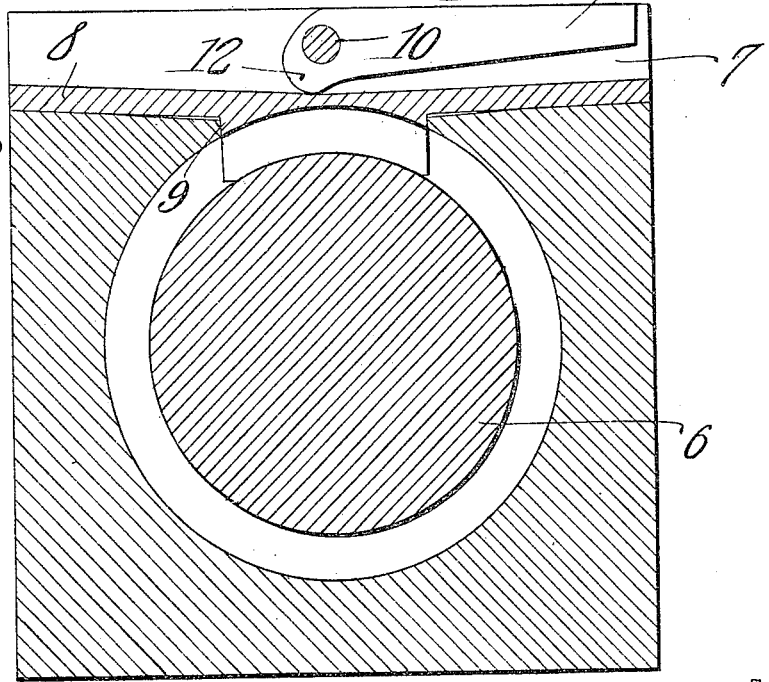
Inventor
Richard Center.

UNITED STATES PATENT OFFICE.

RICHARD CENTER, OF PINE RIDGE, KENTUCKY, ASSIGNOR OF ONE-HALF TO HENRY C. LACEY, OF PINE RIDGE, KENTUCKY.

NUT-LOCK.

951,800.   Specification of Letters Patent.   Patented Mar. 15, 1910.

Application filed November 1, 1909. Serial No. 525,752.

*To all whom it may concern:*

Be it known that I, RICHARD CENTER, a citizen of the United States, residing at Pine Ridge, in the county of Wolfe and State of Kentucky, have invented a new and useful Nut-Lock, of which the following is a specification.

This invention relates to nut locks of that class in which the nut is locked upon the bolt by means of a transverse key carried by the nut, and having a portion which is adapted to be jammed against the threads of the bolt; and it is the object of the invention to provide a lock of this kind which is simple in structure, and efficient in operation, and which can be readily applied to the nut without materially modifying the structure thereof.

The invention also has for its object to provide improved means for bringing the key into locking and unlocking position.

With these objects in view, the invention consists in a novel construction and arrangement of parts to be hereinafter described and claimed, reference being had to the drawing hereto annexed in which, Figure 1 is an elevation of a nut and a portion of the bolt on which it is screwed, provided with my improved lock. Fig. 2 is a section on the line 2—2 of Fig. 1.

In the drawing, 5 denotes the nut, and 6 the threaded portion of the bolt on which the same is screwed. In one of the faces of the nut is made a transverse slot 7 in which is mounted a key 8 comprising a flat spring metal strip having on one side a lug 9. The slot 7 extends transversely of the bolt axis, and intersects the bolt hole of the nut. The key 8 is so placed in the slot 7 that the lug 9 projects through the intersecting portion of the slot into engagement with the teeth of the bolt 6. The outer surface of the lug is threaded forming a continuation of the threads of the nut and adapted to fit the bolt threads.

Mounted on a pivot pin 10 extending across the slot 7, is a lever 11, having a cam-shaped end 12 engageable with that portion of the key which carries the lug, for jamming the threaded portion of the latter against the bolt threads. The cam lever lies entirely within the slot 7 when it is in locking position, the cam bearing down on the key when the lever is swung downwardly into the slot, thus jamming the lug 9 against the bolt threads as already stated. Upon swinging the lever out of the slot, the cam moves away from the key, and the lug is released from the bolt threads, the lug being moved outwardly from the bolt threads by the resiliency of the key, which, as already stated, is formed of spring metal. The threaded surface of the lug 9 is curved to conform to the curvature of the bolt threads.

The lock herein described is simple in structure and efficient in operation. No specially constructed nut is necessary, the only change in the structure of the latter being to make the transverse slot therein, and no parts project from the nut when they are in locking position.

What is claimed is:

1. The combination with a bolt, and a nut screwed thereon, the latter having a slot extending transversely of the bolt, and intersecting the bolt opening of the nut; of a flexible key seating in the slot, and having a lug extending through the intersecting portion thereof into engagement with the threads of the bolt, and means for binding the lug against the bolt threads.

2. The combination with a bolt, and a nut screwed thereon, the latter having a transverse slot intersecting the bolt opening of the nut; of a flexible key seating in the slot, and having a lug extending through the intersecting portion of the slot into engagement with the threads of the bolt, the outer surface of the lug being threaded to fit the bolt threads, and means for binding said lug against the bolt threads.

3. The combination with a bolt, and a nut screwed thereon, the latter having a transverse slot intersecting the bolt opening of the nut; of a flexible key seating in the slot, and having a lug extending through the intersecting portion of the slot into engagement with threads of the bolt, and a cam lever pivotally mounted in the slot, and engageable with the key for binding the lug against the bolt threads.

4. The combination with a bolt, and a nut screwed thereon, the latter having a transverse slot intersecting the bolt opening of the nut; of a flexible key seating in the slot, and having a lug extending through the intersecting portion of the slot into engagement with the threads of the bolt, and a cam lever pivotally mounted in the slot, and engageable with the key for binding the lug against the bolt threads, said lever, when in locking position, lying entirely within the slot of the nut.

5. The combination with a bolt, and a nut screwed thereon, the latter having a slot extending transversely of the bolt, and intersecting the bolt opening of the nut; of a locking member comprising a flat spring metal strip seating in the slot, and having intermediate its ends, on one side, a lug extending through the intersecting portion of the slot into engagement with the threads of the bolt, the outer surface of the lug being threaded to fit the bolt threads, and means for binding said threaded portion of the lug against the bolt threads.

In testimony that I claim the foregoing as my own, I have hereto affixed my signature in the presence of two witnesses.

RICHARD $\overset{\text{his}}{\times}$ CENTER.
mark

Witnesses:
 HENDRICKS DRAKE,
 DICK RIGGS.